(No Model.) 2 Sheets—Sheet 1.
F. TAGGART.
APPARATUS FOR PULVERIZING GRAIN, ORES, &c.
No. 283,830. Patented Aug. 28, 1883.
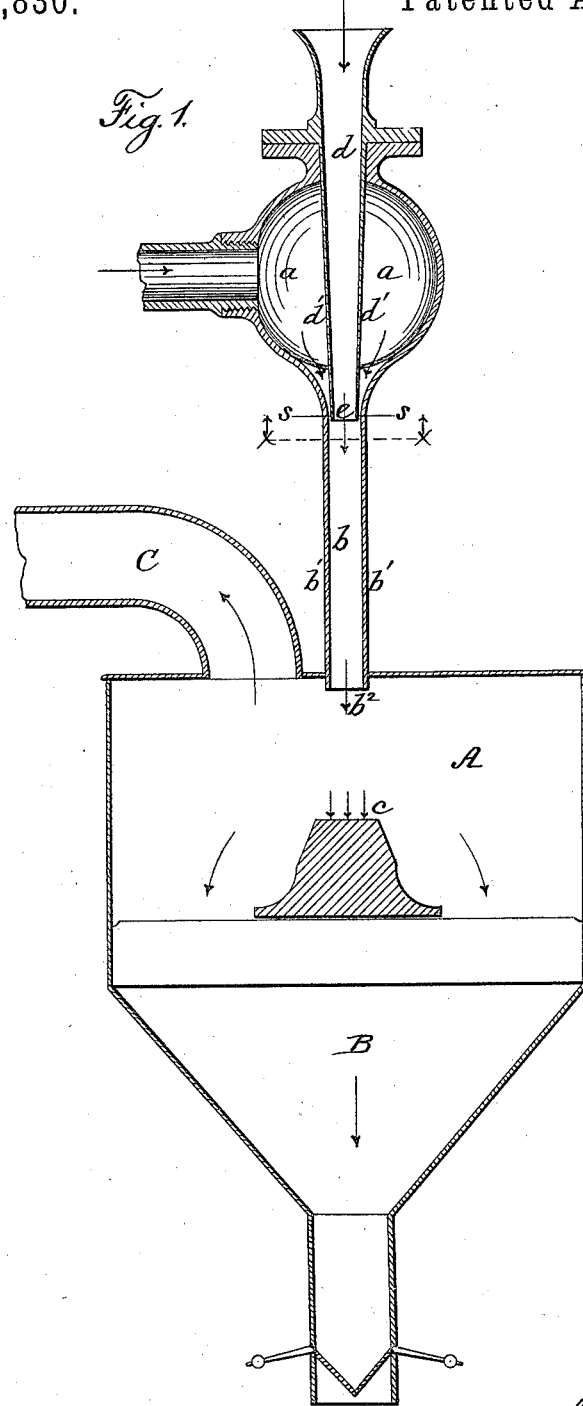

(No Model.) 2 Sheets—Sheet 2.
F. TAGGART.
APPARATUS FOR PULVERIZING GRAIN, ORES, &c.
No. 283,830. Patented Aug. 28, 1883.
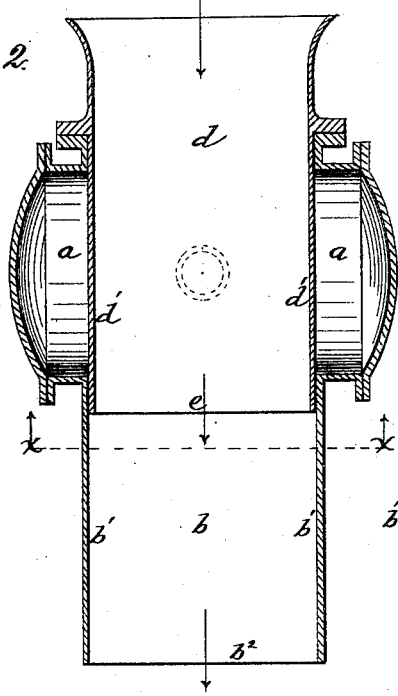
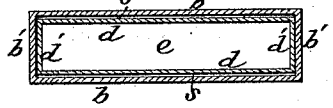
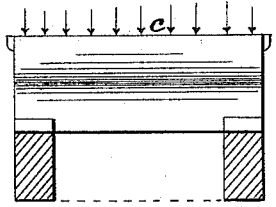
Witnesses:
Amond Brodhag
Howell Bartle
Inventor:
pr. Francis Taggart
Johnson and Johnson
Attys

UNITED STATES PATENT OFFICE.

FRANCIS TAGGART, OF BROOKLYN, NEW YORK.

APPARATUS FOR PULVERIZING GRAIN, ORES, &c.

SPECIFICATION forming part of Letters Patent No. 283,830, dated August 28, 1883.

Application filed November 25, 1881. (No model.)

*To all whom it may concern:*

Be it known that I, FRANCIS TAGGART, a citizen of the United States, residing at Brooklyn, in the county of Kings and State of New York, have invented new and useful Improvements in Apparatus for Pulverizing Grain, Ores, &c., of which the following is a specification.

The improvement herein relates to an apparatus and process for reducing frangible substances to particles and collecting the products, for which a patent was granted to me October 18, 1881, numbered 248,528. The process embraced in said patent consists in projecting the grains or granules with force against a hard abutment or obstacle by means of a continuous current of aeriform fluid under high pressure, into which the substance is introduced at a convenient point, whereby the latter is disintegrated, and then collecting the comminuted particles, while the aeriform fluid is allowed to escape, leaving behind the lighter products of the disintegration. For carrying out the said process I have described and shown in said patent an ejector adapted to produce an annular jet of air drawing with it an interior volume of air, by which the grains or particles of the substance are brought into contact with the jet of air.

My present improvement consists of an ejector and an issuing-orifice adapted to cause the substance to be reduced to be projected in a wide thin sheet, thereby bringing the particles into direct contact with the surface of the abutment, against which they are thrown in such manner as to secure a more uniform reduction than would be attainable when they are projected in a stream of such diameter that the particles would strike one upon another. In effecting this action, in the projection of the substance, the orifice for the issuing air and the passage or chute for the projected grain should be wider in one direction than in the other, and the latter orifice should be proportioned to the size or diameter of the grains or fragments of the substance to be reduced, in order that a thin layer or stratum of grain or substance may be acted upon by the issuing blast and receive a uniform speed of movement, and at the same time prevent or avoid the accumulation of the substance upon the surface of resistance and the formation of a cushion for the oncoming grains or fragments, and by such avoidance increase the economy and utility of the process by effecting the reduction of the projected grains or fragments in the least possible time.

The drawings represent so much of the apparatus as illustrates the separate long and narrow issuing-orifices for the air-jet, and for the substance to be reduced upon the surface of impact, in which—

Figure 1 represents a vertical section; Fig. 2, a similar section taken at right angles to Fig. 1. Fig. 3 shows a cross-section at the line $x$ $x$ of the orifices or openings for the grain or substance and air, respectively; and Fig. 4, the abutment, looking at the surface of impact.

The disintegration or comminution of the substance is effected in a practically closed chamber, A, having a hoppered bottom or spout, B, for the discharge of the heavy portion of the products of the disintegration, while the lighter portion rising with the air passes out by an upward discharge-spout, C, and is conducted to a suitable place.

The ejector proper or jet-mouths, $s$, is formed by the nozzle $e$ of the feeding and conducting tube $d$ for the substance to be reduced, and a directing and discharging chute or tube, $b$, communicating with the chamber $a$, containing atmospheric air, or other aeriform fluid under suitable compression, supplied by any suitable compressor. The nozzle $e$ is wider in one direction than in the other, and enters within and is surrounded by the air-jet impelling tube or chute of corresponding form. The orifice $b^2$ of the tube $b$ is also wider in one direction than in the other, and enters the chamber, wherein the disintegration of the substance is effected, and the abutment or surface of impact $c$ is suitably supported within said chamber, opposite to, in direct line with, and at a suitable distance from, said jet-issuing orifice $b^2$ to receive the projected substance. The feeding and conducting tube $d$ may pass into and through the compressed-air chamber, and it connects with and receives the substance to be treated from a hopper or suitable holder or supply-bin, (not shown,) and delivers it within the tube or chute $b$, back of the issuing-orifice $b^2$ thereof, preferably at a point near the communication of said tube $b$ with the said compressed-air-chamber. The nozzle or orifice $e$ is sufficiently long and narrow to cause the issuing jet of air, under pressure from the jet-mouths $s$, to act upon all the particles of matter issuing from said orifice $e$, so that their impact upon the surface of resistance may be uniform, and hence each grain or particle of ore or other substance will receive the same shattering effect from the impact. The tube $b$ of the air-chamber $a$ is preferably in line with the substance-conducting tube $d$, and the sides $b'$ $b'$ $d'$ $d'$, respectively, of these tubes are flat, and form each a rectangular passage and orifice. As shown, the narrowest sides $b'$ of the feeding-tube are joined with the corresponding sides of the discharging-tube at the nozzle end of the former, and this gives two separate and distinct air-issuing orifices or jet-mouths, $s$, Figs. 1 and 3— say two-hundredths of an inch wide by six inches long—while the nozzle $e$ between the air-jets allows the substance to be projected in a thin sheet. The joining of the narrowest sides of the interior and of the exterior tubes at the ejector-nozzle gives support to said nozzle and prevents the possible deflection at this point of the inner tube, and thereby maintains the fixed relation to each other of the independent jet-mouths. The chamber $a$ is adapted to deliver air under pressure in a thin wide sheet to the jet-mouths, and the communication of the latter with said chamber is back of the nozzle of the inner tube. By this construction the capacity for work is increased by the application of the power of both the jets to draw air by their separate forces into the tube $d$ along with the substance, and thus assist the power of the separate jets to impel the substance at a uniform velocity by reason of the air-jets operating with the forces of two separate and distinct ejectors upon one and the same column of the moving substance. The separate and distinct ejectors give a more efficient application of air-jet by the application of two jets of equal force on opposite sides only of the moving column of substance, and give important advantages in lessening the frictional contact of the air not only at the ejector-orifices, but upon the interior walls of the discharging-tube. Instead of the separate and distinct air-issuing orifices, I may use a continuous air-issuing orifice—that is, an orifice open all around between the tubes $b$ and $d$; but the construction shown is preferred. The feeding and conducting tube $d$ is preferably made flaring from its orifice, and the substance may be projected downward, as shown, or horizontally. The surface $c$ of impact for the substance is preferably long and narrow to receive the projected sheet of the substance from the long and narrow issuing-nozzle of the tube $b$.

The capacity for work may be increased by using any number of ejectors of the construction stated. It is obvious that the relation of the tubes composing the ejector device may be varied, so long as the air and the substance projecting nozzles have the form and are employed in the combination shown and described.

This specification is intended to cover only the improvement specifically embraced in the claims. Other improvements of construction and of combination herein described and shown are made the subject of a division application for Letters Patent.

I claim—

1. In apparatus for disintegrating and comminuting grain and other frangible substances, the feeding and conducting tube or chute having at the end an orifice that is long and narrow, in combination with a chamber for containing air under high pressure, a jet-mouth for the issuing current of air, adjacent to the end or orifice of the feeding and conducting tube or chute, and an abutment or surface of resistance, substantially as described, for the purpose specified.

2. The combination, in apparatus for disintegrating grain and other frangible substances, of an ejector formed with an elongated orifice of discharge, with a correspondingly-elongated abutment, substantially as described, for the purpose specified.

In testimony whereof I have hereunto set my hand in the presence of two subscribing witnesses.

FRANCIS TAGGART.

Witnesses:
 A. E. H. JOHNSON,
 J. W. HAMILTON JOHNSON.